United States Patent
Franke

(10) Patent No.: US 7,400,673 B2
(45) Date of Patent: Jul. 15, 2008

(54) METHOD OF DETERMINING AND DISPLAYING POWERS OF CODE CHANNELS AND ANALYSIS DEVICE

(75) Inventor: Jens Franke, Germering (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 689 days.

(21) Appl. No.: 10/801,071

(22) Filed: Mar. 15, 2004

(65) Prior Publication Data
US 2004/0213173 A1 Oct. 28, 2004

(30) Foreign Application Priority Data
Mar. 19, 2003 (DE) ................. 103 12 243

(51) Int. Cl.
H04B 3/46 (2006.01)
H04B 17/00 (2006.01)
H04Q 1/20 (2006.01)
H04B 1/707 (2006.01)
H04L 1/24 (2006.01)
(52) U.S. Cl. .................. 375/224; 370/241; 702/60
(58) Field of Classification Search ................. 375/147, 375/224; 370/241, 203, 342, 335, 311; 702/57, 702/60, 61; 324/76.11
See application file for complete search history.

(56) References Cited

U.S. PATENT DOCUMENTS

| | | | | |
|---|---|---|---|---|
| 6,104,983 A * | 8/2000 | Nakada | ........................ | 702/66 |
| 6,219,340 B1 * | 4/2001 | Cutler et al. | ................. | 370/241 |
| 6,519,227 B1 * | 2/2003 | Koizumi | ...................... | 370/241 |
| 6,993,003 B2 * | 1/2006 | Huber | ........................ | 370/335 |
| 7,020,096 B2 * | 3/2006 | Kurihara et al. | .............. | 370/252 |
| 7,162,396 B2 * | 1/2007 | Nakada et al. | ............... | 702/189 |
| 7,184,406 B2 * | 2/2007 | Engholm et al. | ............ | 370/241 |
| 2002/0085522 A1 * | 7/2002 | Huber | ........................ | 370/335 |
| 2003/0039264 A1 * | 2/2003 | Hando | ........................ | 370/441 |
| 2004/0032897 A1 * | 2/2004 | Kuntz et al. | .................. | 375/130 |

FOREIGN PATENT DOCUMENTS

EP 1 259 013 A1 11/2002

* cited by examiner

*Primary Examiner*—Jean B Corrielus
(74) *Attorney, Agent, or Firm*—Christensen O'Connor Johnson Kindness PLLC

(57) ABSTRACT

The invention relates to an analysis device and a method of determining and displaying powers of code channels of a CDMA signal, the powers of the individual code channels being determined and shown on an output device. The powers of the individual code channels are determined respectively for an in-phase arm (I) and a quadrature phase arm (Q) and the powers of the code channels of the in-phase arm (I) and/or the powers of the code channels of the quadrature phase arm (Q) are shown. In the representation of the powers of the code channels of the in-phase arm (I), those code channels, which are inactive in the in-phase arm (I) but active in the quadrature phase arm (Q), are shown distinguishably from the remaining code channels. In the representation of the powers of the code channels of the quadrature phase arm (Q), those code channels, which are inactive in the quadrature phase arm (Q) but active in the in-phase arm (I), are shown distinguishably from the remaining code channels.

6 Claims, 3 Drawing Sheets

Fig. 4

Determining the powers of
the individual code channels
respectively for an in-phase
arm and quadrature phase arm

↓

Show the powers of the code
channels of the in-phase arm and/or
the powers of the code channels
of the quadrature phase arm

METHOD OF DETERMINING AND DISPLAYING POWERS OF CODE CHANNELS AND ANALYSIS DEVICE

BACKGROUND

A method of displaying powers of code channels is known for example from U.S. Pat. No. 6,219,340 B1. The powers of the individual code channels are determined after the demodulation of an incoming CDMA signal and are shown on a display device in the form of a bar diagram. In addition to the power, which corresponds to the height of an individual bar, also the association with a specific code class is shown as additional information. For this purpose, in the representation the width of the bar is reduced with a respectively higher code class. In addition, preferably the powers of active code channels are shown as filled-in bars, whereas the powers of the inactive code channels are displayed merely as a dash.

It is disadvantageous in the method proposed in U.S. Pat. No. 6,219,340 B1 that only the total power is shown for each code channel. A distribution with respect to an in-phase arm and a quadrature phase arm is not shown. A judgement can therefore also not be made about whether possibly one of the arms is inactive or not, as can be the case however for example with a signal of a CDMA2000 mobile radio system.

SUMMARY

It is the object of the invention to produce a method of determining and displaying the powers of code channels of a CDMA signal and an analysis device, also the activity and inactivity of the two arms being detectable in addition to the powers of the code channels.

The object is achieved by the method according to the invention according to claim 1 and by the analysis device according to the invention according to claim 6.

According to the method according to the invention and the analysis device according to the invention, the power with respect to the in-phase arm and the quadrature phase arm is determined separately for each code channel. The thus determined powers are shown with respect to the in-phase arm and/or the quadrature phase arm so that an unequivocal assignment of the power of the code channels to respectively one of the two arms is possible. In the representation of the powers of the code channels of respectively one arm, those powers of code channels which are inactive in the representation of the arm but active in the corresponding code channel of the other arm are shown distinguishably from the powers of the remaining code channels.

It is hence achieved that for example a surprisingly high power of a supposedly inactive code channel of the one arm can be assigned to cross-talking of the corresponding code channel of the other arm. This is helpful in particular when evaluating the powers of the inactive code channels since the actually inactive code channels must not exceed a specific level. A "quasi-inactive" code channel of an arm is produced for example when, because of incomplete orthogonality, a signal with an actually pure in-phase component also has a quadrature phase component or vice versa and hence a power component of a code channel which is actually active on the other arm is measured.

Advantageous developments of the method according to the invention are embodied in the sub-claims.

It is advantageous in particular to show distinguishably not only the powers of those code channels which are inactive in the shown arm but active in the other arm, but also to show the powers of those channels which are active in both arms distinguishably from the powers of the remaining code channels. Hence, the entire information is already given by the representation of an arm concerning in which code channel which arm is active.

According to a further advantageous embodiment, the powers of the code channels for the in-phase arm and the quadrature phase arm are shown respectively in a separate diagram. This form of representation of the two arms is especially clear and makes it possible to detect the information particularly rapidly.

Alternatively, it can be advantageous to show the powers of the code channels for the in-phase arm and the quadrature phase arm in a common diagram, for example in a three-dimensional representation or in bars disposed beside each other. In this way, in only one single diagram, likewise the entire information concerning the activity and the level of the respective powers of the code channels is contained. Such a representation is advantageous in particular when importance is placed simultaneously on the representation of the two arms, but only a small space on a display device is usable, for example in order to display additional information in the remaining region of the display device.

BRIEF DESCRIPTION OF THE DRAWINGS

The method according to the invention and the analysis device according to the invention are shown in the drawing and are explained in more detail in the subsequent description. There are shown:

FIG. 4 a schematic representation of the method according to the invention.

DETAILED DESCRIPTION

Figure 1:
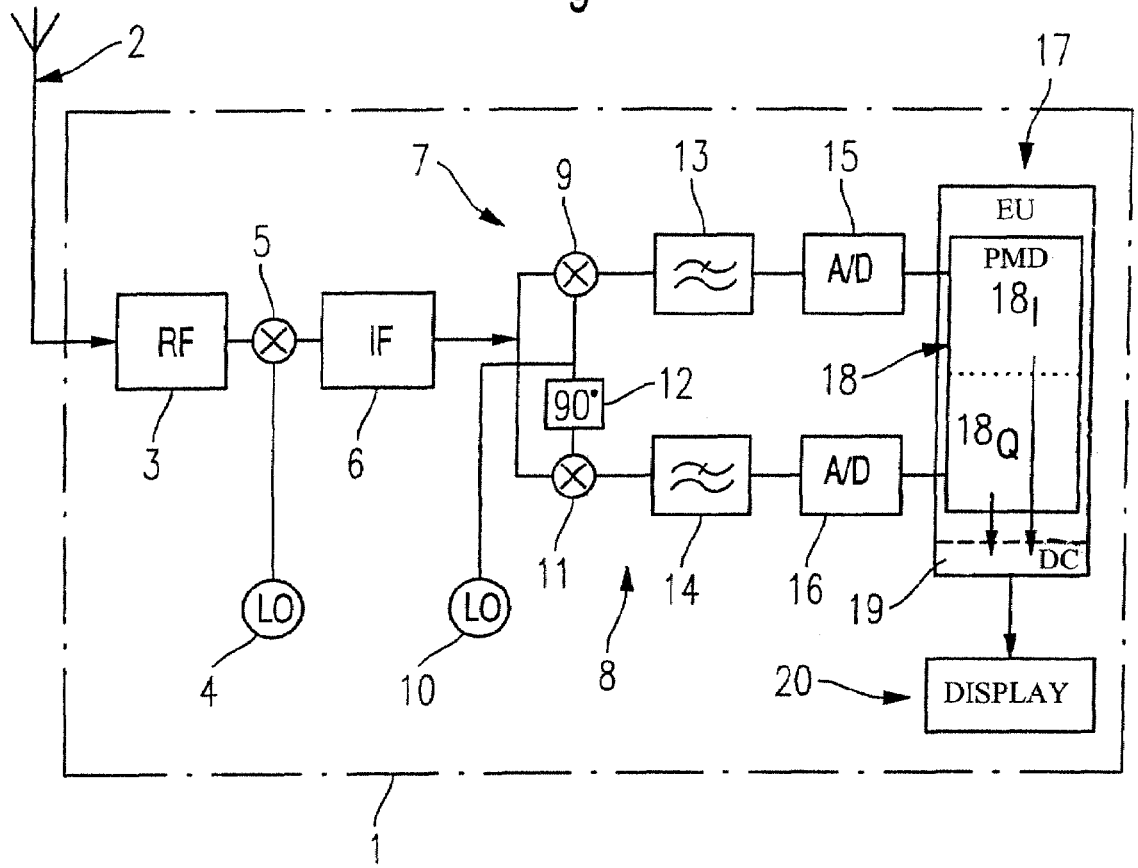
FIG. 1 a schematic representation of the analysis device according to the invention.

An analysis device 1 according to the invention is shown in FIG. 1. A CDMA signal is supplied to the analysis device 1 for example via an antenna 2. In a high-frequency portion 3, for example a corresponding connection for an antenna or a non-illustrated measuring line, via which the high-frequency signal can be supplied, is formed for this purpose.

A frequency which is mixed in a first mixer 5 with the high-frequency signal is generated by a first local oscillator 4. The signal mixed down in this way to an intermediate frequency is further processed in an intermediate frequency portion 6 and finally is supplied to an in-phase arm 7 and to a quadrature phase arm 8.

In the in-phase arm 7, the intermediate frequency signal is mixed in an in-phase mixer 9 with a signal generated by a second local oscillator 10 into the base band. Analagously hereto, a quadrature mixer 11 is disposed in the quadrature phase arm 8, which mixer 11 mixes however the incoming intermediate frequency signal with a signal of the second local oscillator 10, which signal is dephased by means of a 90° phase shifter 12, into the base band.

The thus generated base band signals of the in-phase arm 7 and of the quadrature phase arm 8 are freed of higher-frequency components respectively by means of a low-pass 13 or 14 and finally are supplied in the in-phase arm 7 to an in-phase-analogue-digital converter 15 or respectively in the quadrature phase arm 8 to a quadrature-analogue-digital converter 16. The digital signals of the in-phase arm 7 and also of the quadrature phase arm 8 are supplied to an evaluation unit 17 which includes a power measuring device 18. The power measuring device 18 has an in-phase power measuring portion 18$_I$ and also a quadrature phase power measuring portion 18$_Q$ which, for each code channel of the CDMA signal, can determine the power for the in-phase arm 7 and the quadrature phase arm 8 separately from each other, e.g. by adding up the squared scanning values of the individual code channels.

The information about the level of power of the code channels for the in-phase arm 7 and the quadrature phase arm 8 are supplied to a display control device 19 which is connected for its part on the output side to a display device 20. The display device 20, as is indicated in the shown embodiment, is either a display integrated into the analysis device 1 or else for example an external monitor which is connected to the evaluation unit 17.

If for example a mobile radio system according to the CDMA2000 standard is used, then, when generating the transmission signal for the in-phase arm 7 and for the quadrature phase arm 8 respectively independently of each other, a BPSK (Binary Phase Shift Keying) modulation is implemented. This means that the in-phase arm 7 and the quadrature phase arm 8 for each code channel can be active independently of each other. Of course, both arms can also be inactive or both arms can simultaneously be active.

For the evaluation unit 17, this would mean in the case of ideal modulation and demodulation that, in the event of only the quadrature phase arm 8 being active with respect to one code channel, only one noise power in the in-phase power measuring portion 18$_I$ can be measured. Since in practice however, neither the modulator on the side of the transmitter nor the demodulator on the receiver side operate ideally, a power deviating from the noise power can also occur in the in-phase arm 7 for one code channel, which power is based in the quadrature phase arm 8 for this code channel. In reverse, also an active in-phase arm 7 for one code channel can cause a power in a quadrature phase arm 8 which is actually inactive in this code channel. This is then termed a quasi-inactive code channel respectively in the relevant arm.

Figure 2:
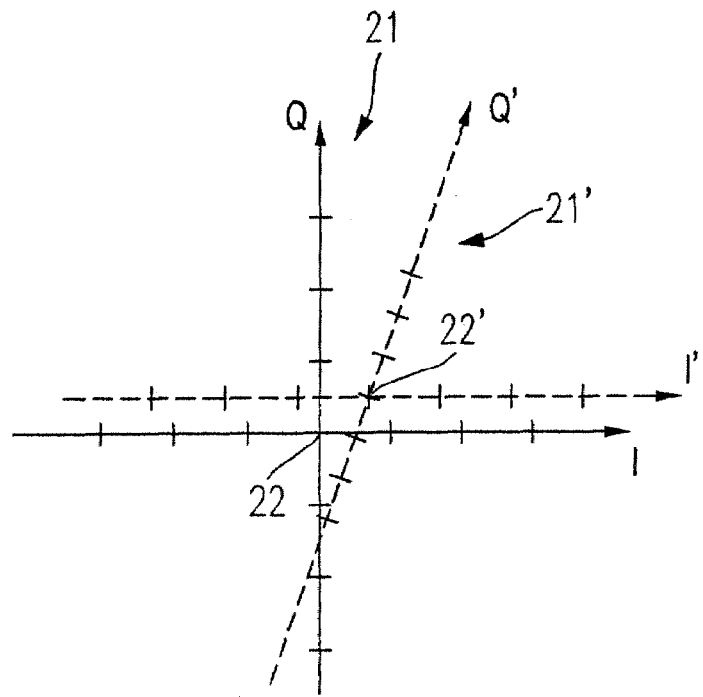
FIG. 2 a schematic representation of the reasons for a quasi-inactive code channel.

The occurrence of such cross-talk from an active arm in an actually inactive arm for one code channel is shown schematically in FIG. 2. Three different mechanisms lead to the cross-talk in the respectively other arm.

In FIG. 2, an I-Q diagram 21 of a modulator and also an I'-Q' diagram 21' for the corresponding demodulator on the part of the receiver are shown. In addition to the deviation of the two origins 22 and 22' ("offset") of the coordinate systems 21 and 21' from each other, it can be detected furthermore that an incomplete orthogonality is present ("imbalance") between the in-phase axis I' and the quadrature axis Q' of the receiver. The varying scaling ("impairment") of the coordinate axes caused by varying amplification of the in-phase arm 7 or of the quadrature phase arm 8 can be considered as the third possible source of error, as is indicated in FIG. 2 for the quadrature axis Q of the transmitter and the quadrature axis Q' of the receiver.

Figure 3:
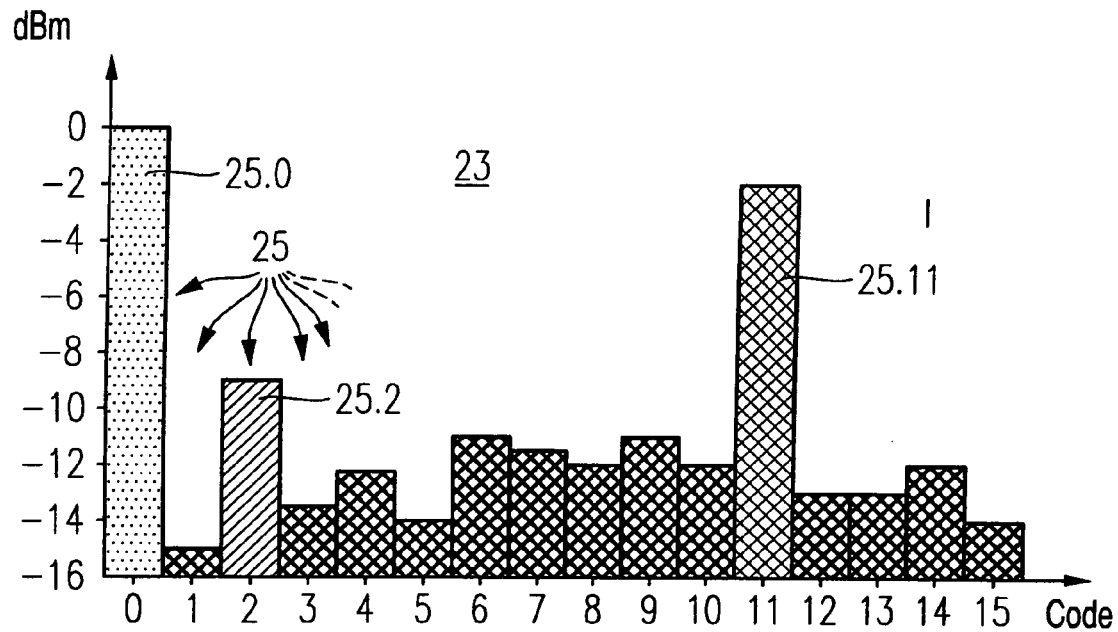
FIG. 3 a representation, by way of example, of measured powers of an in-phase arm and of a quadrature phase arm.
Figure 3:
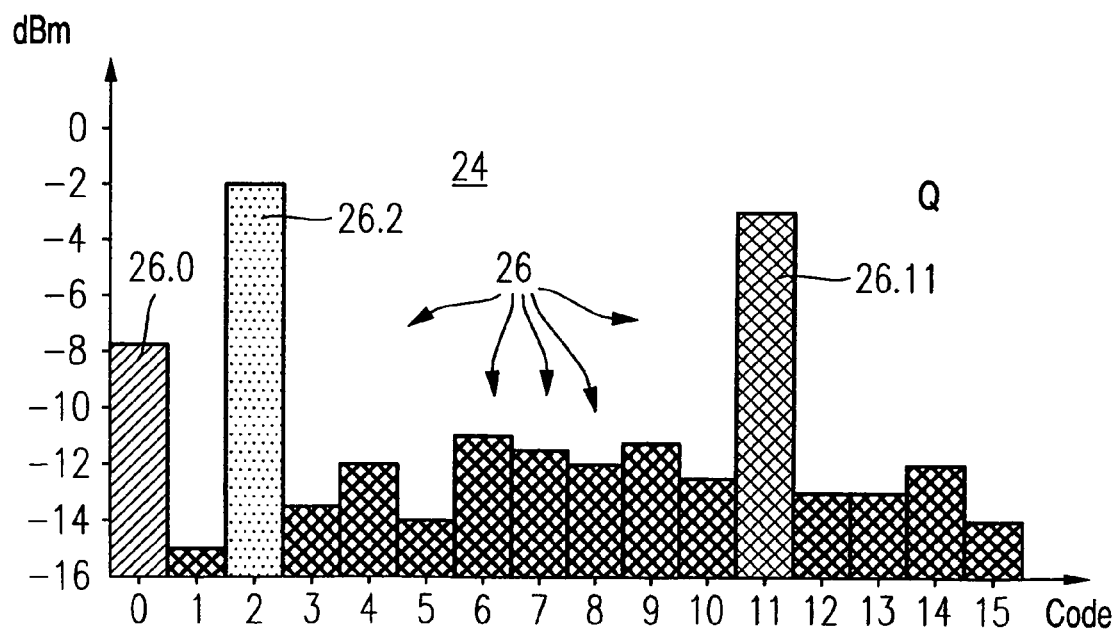

In FIG. 3, a first diagram 23 for showing the power of the code channels of the in-phase arm 7 is shown by way of example. In a second diagram 24, the power of the code channels of the quadrature phase arm 8 is plotted respectively in corresponding representation. The first and second diagram 23 and 24 can be shown simultaneously on the display device 20 for example in the shown manner.

In the representation of the powers of the in-phase arm 7, the power of the respective code channel is shown as a bar 25 according to the x axis. A logarithmic scaling is chosen preferably for the y axis. The height of the bars 25 indicates thereby the power of the respective code channel which has been determined in the in-phase arm 7 by the in-phase power measuring portion 18$_I$. In the shown diagram 23, the powers measured respectively in the in-phase arm 7 for the code channels 0 to 15 are shown as bars 25, the code channels 0 to 25, the channel number of which is plotted on the x axis, being in this case the code channels of a specific code class. For the sake of improved clarity, representation of further code channels of other code classes has been dispensed with.

In the shown embodiment, the power for the code channel 0 is indicated by the bar 25.0. This can be effected for example by using a specific filling colour or by a specific filling pattern, as is indicated in FIG. 3 by the dotted interior of the bar 25.0. The dotted filling is used in the first diagram respectively for the representation of the powers of those code channels which are active exclusively in the in-phase arm 7.

The bar 25.2, which corresponds to the measured power of the code channel 2 of the in-phase arm 7, is in contrast shown in hatching with a different filling colour or in the embodiment with a different filling pattern. Those bars 25 respectively in the first diagram 23, in which the in-phase arm 7 is inactive but the quadrature phase arm 8 is active, are provided with such a hatched filling. It is thereby irrelevant for the choice of representation how high the power measured actually in the respective code channel of the in-phase arm 7 is and whether actually a power component due to cross-talk of the quadrature phase arm 7 is present. The decisive criterion is exclusively in which of the two arms an actual activity prevails.

Accordingly, for those code channels, in which an actual activity occurs both in the in-phase arm 7 and in the quadrature phase arm 8, a further graphic differentiation can also be found. In FIG. 3, this is shown for example for the bar 25.11 which is filled in by the filling pattern of a light grey cross-hatching. Alternatively, a different filling colour can be used. The remaining bars, in which the code channels are inactive both in the in-phase arm 7 and in the quadrature phase arm 8, are shown in turn graphically distinguishably from the remaining bars, e.g. due to a different filling colour or a different filling pattern. In the shown embodiment, this occurs by means of a dark grey filling colour.

In the second diagram 24, in which the measured powers of the code channels of the quadrature phase arm 8 are shown, the power of the code channel 0 is shown correspondingly by means of hatching of the bar 26.0.

Corresponding to the embodiments relating to the first diagram 23, it is indicated in the second diagram 24 of the quadrature phase arm 8 by means of such marking that the corresponding code channel in the quadrature phase arm 8 is inactive, but an activity of the code channel 0 occurs in the in-phase arm 7. The filling patterns or respectively filling colours of the bars 25.2 and 26.0 are therefore identical.

Reference should be made once again to the fact that, in the case of the representation of such a quasi-inactive code channel of the quadrature phase arm 8, it remains without consideration whether the actually measured power is a pure noise power or whether a power component is contained therein which is produced by cross-talk of the active in-phase arm 7.

Analogously, in the second diagram 24, the bar 26.2, which reproduces the power of the code channel 2 of the quadrature phase arm 8 determined in the quadrature power measuring portion 18$_Q$, is now shown with a dotted filling or with another filling colour, by means of which it is indicated in turn that the code channel 2 in the quadrature phase arm 8 is actually active, whereas no activity occurs in the code channel 2 of the in-phase arm 7. The filling patterns or respectively filling colours of the bars 26.2 and 25.0 are therefore identical.

The light grey filling pattern of the bar 26.11 shows again the doubled activity of the code channel 11 both in the in-phase arm 7 and in the quadrature phase arm 8. Corresponding to the doubled activity, the representation of the code channel 11 is effected by the bars 25.11 and 26.11, the bars 25.11 and 26.11 respectively being filled with the same filling pattern or the same filling colour.

The remaining code channels are in turn filled with dark grey cross-hatching or with a different filling colour and hence show that in these code channels activity prevails neither in the in-phase arm 7 nor in the quadrature phase arm 8.

From the corresponding use of fillings of the bars 25 and 26 in the first diagram 23 and in the second diagram 24, it is revealed that a code channel shown with a dotted bar 25 in the first diagram 23 is shown by a hatched bar 26 in the second diagram 24. In reverse, a code channel of the first diagram 23 shown with a hatched bar 25 is indicated in the second diagram 24 with a dotted filling.

Instead of filling the bars 25 and 26 in the indicated manner, of course other graphic differentiations are also conceivable. In particular, for active, quasi-active and doubly active code channels, one specific colour respectively can be used in the display. Likewise, a quasi-inactive code channel can be shown with an identical filling to the code channels which are inactive in both arms, the respectively quasi-inactive code channels being indicated, e.g. by sparkling of the bar for distinguishability. In addition, the bars need not definitely be shown differently; it suffices also for example to show the code channel numbers graphically distinguishably.

In contrast to the preferred representation of the powers of the code channels of the in-phase arm 7 and of the quadrature phase arm 8 separated into a first diagram 23 and a second diagram 24, it is likewise possible to use a single, e.g. three-dimensional diagram in which the in-phase arm 7 and the quadrature phase arm 8 are plotted in the direction of the third axis. A further possible representation is to provide a bar for each arm and to indicate the latter in one common diagram respectively directly next to each other for each code channel.

The invention claimed is:

1. A method of determining and displaying the powers of code channels of a CDMA signal, the powers of the individual code channels being determined and displayed on an output device, characterized by the following method steps:
   determining the powers of the individual code channels respectively for an in-phase arm and a quadrature phase arm,
   displaying the powers of the code channels of the in-phase arm and/or the powers of the code channels of the quadrature phase arm,
   in the representation of the powers of the code channels of the in-phase arm, the powers of those code channels, which are inactive in the in-phase arm but active in the quadrature phase arm, being displayed distinguishably from the powers of the remaining code channels and/or
   in the representation of the powers of the code channels of the quadrature phase arm, those code channels, which are inactive in the quadrature phase arm but active in the in-phase arm, being displayed distinguishably from the remaining code channels.

2. The method according to claim 1,
characterised in that
those code channels, which are active both in the in-phase arm and in the quadrature phase arm, are displayed in the respective representation of the powers of the code channels of the in-phase arm or respectively of the quadrature phase arm distinguishably from the remaining code channels.

3. The method according to claim 1 or 2,
characterised in that
in the representation of the powers of the code channels of the in-phase arm or respectively of the quadrature phase arm for graphic differentiation, the powers of the code channels which are active only in the in-phase arm or respectively only in the quadrature phase arm, the powers of the code channels which are inactive in the in-phase arm or respectively in the quadrature phase arm but active in the quadrature phase arm or respectively in the in-phase arm and/or of the code channels which are active in both arms are displayed respectively distinguishably by colour or graphically.

4. The method according to claim 1,
characterised in that
the representation of the powers of the code channels of the in-phase arm and/or of the quadrature phase arm are separately displayed.

5. The method according to claim 1,
characterised in that
the representation of the powers of the code channels of the in-phase arm and/or of the quadrature phase arm are displayed together.

6. An analysis device for analysing a CDMA signal, comprising a receiver device for receiving the CMDA signal, a demodulator for demodulating the received signal, a power measuring device for measuring the power of individual code channels, and an output device for displaying the powers measured in the individual code channels,
   characterised in that,
   by means of the power measuring device, the powers of the code channels for the in-phase arm and for the quadrature phase arm are measured separately from each other and in that, by means of the output device, the powers of the code channels of the in-phase arm and/or of the quadrature phase arm are displayed,
   wherein, by means of the output device, in the representation of the powers of the code channels of the in-phase arm, those code channels, which are inactive in the in-phase arm but active in the quadrature phase arm, are displayed distinguishably from the remaining code channels, and/or
   wherein, by means of the output device, in the representation of the powers of the code channels of the quadrature phase arm, those code channels, which are inactive in the quadrature phase arm but active in the in-phase arm, are displayed distinguishably from the remaining code channels.

\* \* \* \* \*